(12) United States Patent
Julin et al.

(10) Patent No.: US 8,122,517 B2
(45) Date of Patent: Feb. 21, 2012

(54) MEDIATED ACCESS OF SOFTWARE DUMPED DATA THROUGH SPECIALIZED ANALYSIS MODULES

(75) Inventors: Daniel P. Julin, New York, NY (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 12/061,386

(22) Filed: Apr. 2, 2008

(65) Prior Publication Data

US 2009/0254999 A1 Oct. 8, 2009

(51) Int. Cl.
*G06F 17/30* (2006.01)
(52) U.S. Cl. .......... 726/28; 726/1; 726/26; 713/165
(58) Field of Classification Search .......... 726/28, 726/1, 26, 27; 707/999.009; 713/165, 166, 713/167, 187
See application file for complete search history.

(56) References Cited

U.S. PATENT DOCUMENTS

2008/0126301 A1* 5/2008 Bank et al. .......... 707/3

OTHER PUBLICATIONS

"Anti-Hacker Tool Kit: Reverse Engineering Binaries," Ethical Hacker Network, Nov. 2, 2007.
Sawyer, J.H., "Incident Response Tools," TechTracker, Dec. 7, 2006.
Broadwell, P., et al., "Scrash: A System for Generating Secure Crash Information," Proc. 11th USENIX Security Symposium, Aug. 4-8, 2003.
Painter, P., "Secure BSTR and Other Data Wrappers", The Code Project—COM/DCOM/COM+, Oct. 16, 2003.

* cited by examiner

*Primary Examiner* — Kim Vu
*Assistant Examiner* — Baotran N To
(74) *Attorney, Agent, or Firm* — Patents on Demand P.A.; Brian K. Buchheit; Scott M. Garrett

(57) ABSTRACT

The present invention can include a method, computer program product, and system for mediating access to content of a software dump. The invention can identify an event occurring within a computing device, which causes data to be dumped to file. A dump file can be created responsive to the event, wherein the dump file includes data defining a state of the computing device. Using an analysis module to analyze the dump file to determine content to be placed in a tailored dump file. In one embodiment, custom analysis modules or custom modifications to existing analysis modules can be added to the computing device at any time, which permits a tailoring of dumps to cover circumstances not originally known in advance of a situation for which they are needed. The tailored dump file can include a subset of the content of the dump file for which access privileges have been granted in accordance with the analysis module. The output file can be created, which comprises the determined content.

19 Claims, 3 Drawing Sheets

US 8,122,517 B2

MEDIATED ACCESS OF SOFTWARE DUMPED DATA THROUGH SPECIALIZED ANALYSIS MODULES

BACKGROUND OF THE INVENTION

The present invention relates to the field of software security and, more particularly, to mediated access of software dumped data through specialized analysis modules.

When determining a problem on a computing system it is not uncommon to gather state information, memory information, and other pertinent system data for analysis. This information is aggregated in a software dump (e.g., core dump, user dump, system dump, JAVA dump, service dump, etc.) file(s) when predetermined events/conditions of a computing system occur or at the command of a system administrator.

In many cases, software dump files can contain sensitive information and/or normally protected information taken from memory and system processes. This information is not protected in the software dump file, which frequently exists in a format that is able to be accessed by others without requiring authentication or any security key or certificate. That is, the content of the software dump files exists "in the clear" in an unencrypted, non-protected form. Many software forensic tools exist to extract meaning from such a dump file.

Recently, software vendors have begun bundling remote problem determination tools along with the provided software in an attempt to improve software quality. These tools, however, frequently send software dump data over unsecured channels to repository servers for later analysis, as shown in FIG. 1 (Prior Art). In FIG. 1 (Prior Art), a dump tool 116 executing on a computing device 110 can obtain data from processor 112 and memory 114 to be placed into a software dump 120. It is not uncommon that tool 116 gathers all available data from areas 112, 114. In these situations, software dump 120 can contain privileged information, such as personal information, which is often extraneous data not pertinent to the problem being diagnosed. As a result, software dump 120 can regularly include privileged data 123 and non-privileged data 124.

Frequently, a software dump 120 is conveyed over networks such as network 130 to a central location. In many instances, network 130 includes insecure networks such as the Internet which can allow an attacker or observer to obtain privileged data 123. Once received by repository server 140, software dump data 120 can be stored in data store 144. In current manifestations, privileged data 123 is not well protected and can be inspected by any user/entity with access to software dump 120. In an extreme situation, an unauthorized user can initiate actions designed to trigger a software dump, which the invader can intercept and later analyze.

In many cases, the problems with data being conveyed in software dumps 120 involves more than individual unauthorized users/entities gaining access to the repository server 140. For instance, the computing device 110 can belong to a customer and the repository server 140 can belong to a software vender. Often, the customer does not wish any agent of the software vender to have access to privileged data 123, which is currently conveyed to data store 144 in a core dump 120 situation.

BRIEF SUMMARY OF THE INVENTION

One aspect of the present invention can include a method, computer program product, and system for mediating access to content of a software dump. The aspect can identify an event occurring within a computing device, which causes data to be dumped to file. A dump file can be created responsive to the event, wherein the dump file includes data defining a state of the computing device. An analysis module can be used to analyze the dump file to determine content to be placed in a tailored dump file. The tailored dump file can include a subset of the content of the dump file for which access privileges have been granted in accordance with the analysis module. The output file can be created, which comprises the determined content.

Another aspect of the present invention can include a system for mediating access to dump file content. The system can include an artifact analyzer configured to extract content from a software dump file. The dump file can include data defining a state of the computing device. The system can also include an artifact access mediator configured to generate tailored dump output including a subset of information from the software dump file based upon permissions determined by an access module. The artifact access mediator ensures that the tailored dump file lacks protected content other than content specifically authorized by the access module.

DETAILED DESCRIPTION OF THE INVENTION

Figure 1:
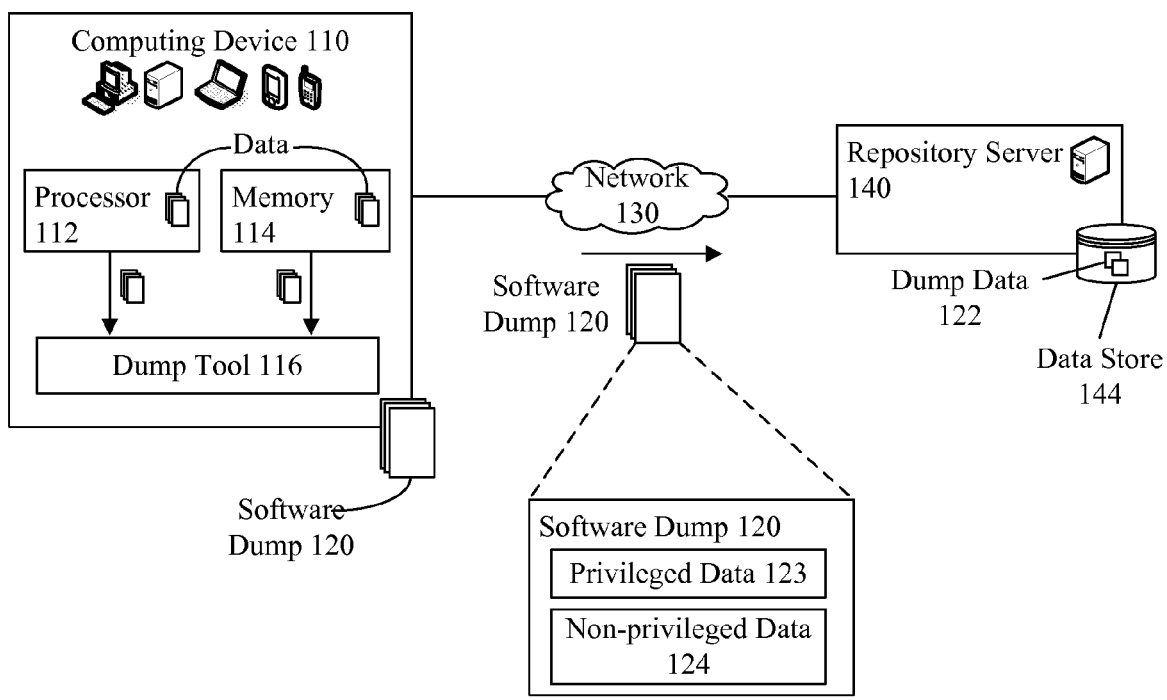
FIG. 1 (Prior Art) illustrates the conventional system for the creation and usage of core dump information.

The present invention discloses a solution for providing mediated access to content of software dumps using controlled access mechanisms. In the solution, a software dump file can be analyzed by a software component, which generates a tailored output file that includes a subset of content extracted from the software dump. The output file can be of a different format (e.g., text, XML) than the original software dump. In one embodiment of the invention, analysts can remotely issue a command to receive an output file based upon a software dump, which provides them with system state information. In one embodiment, analysts can generate customized modules, which produce desired software dump derived information, when triggered. Additionally, a user of a system from which the software dump is generated can review/approve output file content and/or customized modules before output files are able to be conveyed and/or before a customized module is permitted to execute.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
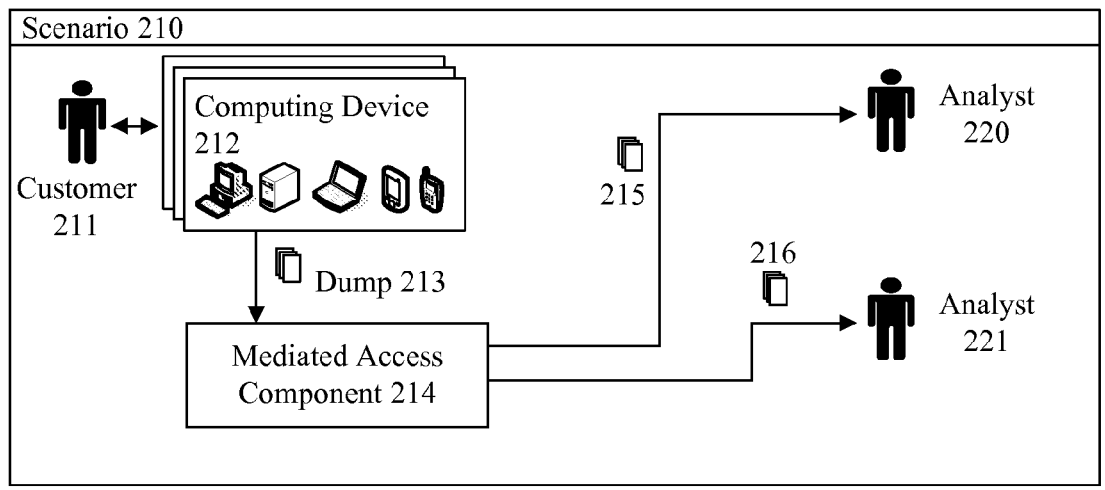
FIG. 2 is a schematic diagram illustrating set of scenarios illustrating a solution for providing mediated access to software dumps in accordance with an embodiment of the inventive arrangements disclosed herein.
Figure 2:
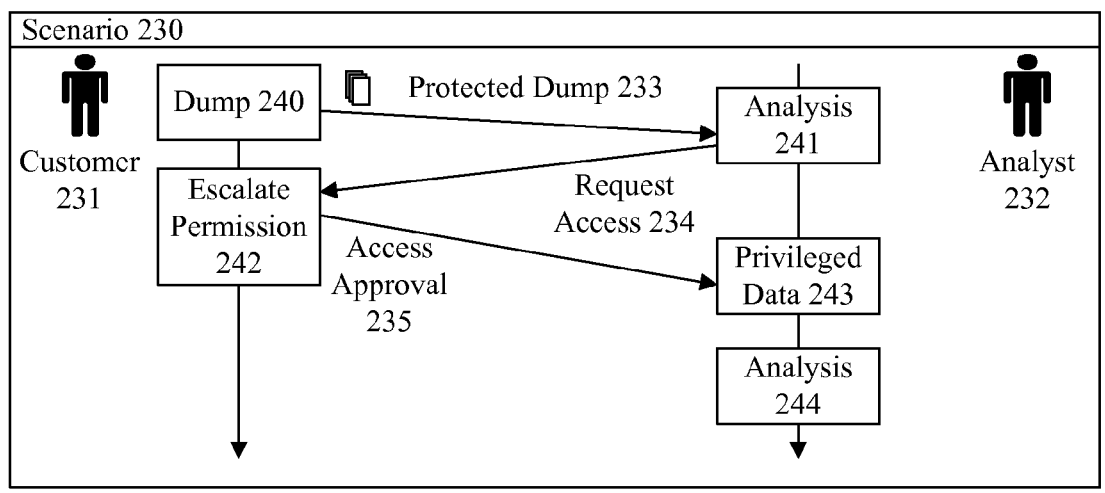
Figure 2:
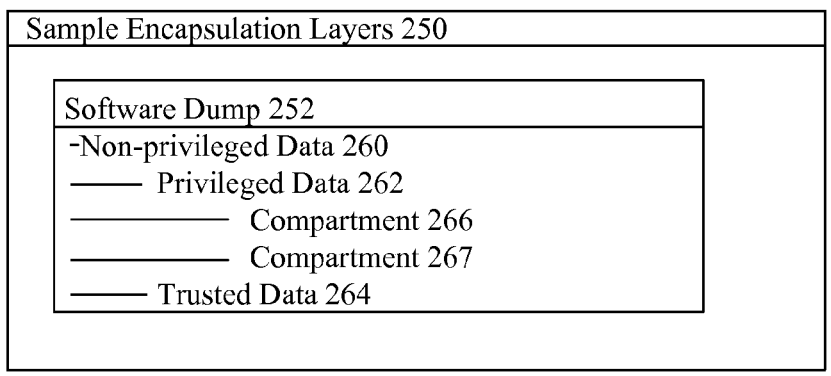

FIG. 2 is a schematic diagram illustrating set of scenarios 210 and 230 illustrating a solution for providing mediated access to software dumps in accordance with an embodiment of the inventive arrangements disclosed herein. As used herein, a software dump can represent any set of information about a current state of a computing device. The software dump can represent a low-level dump, such as a core dump, a user dump, a JAVA dump, a service dump, a system dump, and the like. The software dump can also represent a higher-level dump (e.g., an application level) containing application state information. The software dump can be automatically triggered based upon a condition or state of device (such as an error condition or crash) or can be manually triggered by a user input or an application issued command. A manually triggered software dump can be treated as a background process that does not otherwise effect a current operation of the device.

In scenario 210, customer 211 can utilize mediated access component 214 to provide different portions of dump 213 content to analysts 220, 221 as appropriate. A device 212 can be used primarily by a customer 211, which can contain information for which not all of the analysts 220, 221 should have access. The content contained in an original software dump 213 can be analyzed and filtered by component 214 before being conveyed as dump 215 and/or 216 to analyses 220 and 221. Different analysts 220, 221 can have different levels of permission and/or different content accessing needs relevant for their analysis tasks. The mediated access component 214 can be configured by customer 211 or an authorized administrator to ensure needed content is contained in the dump versions 215, 216 received by the analysts 220, 221 but that sensitive and/or protected information is not needlessly exposed. Sensitive and/or protected information can include, for example, social security numbers, credit card information, medical information, passwords, corporate secrets, and the like. In one embodiment, the customer 211 can be prompted by mediated access component 214 to verify that information contained within dumps 215 and 216 is permitted before conveying the dumps 215, 216 to the analysts 220, 221.

Dumps 215 and 216 can be electronic documents containing content obtained from software dump 213. In one embodiment, dumps 215 and 216 can be in a different format than the original dump 213. For example, dumps 215 and 216 can be in a text format, an XML format, or other more-or-less human-readable format. Use of a human-readable format can be advantageous for permitting customer 211 review/approval of included content and can make examination of dumps 215, 216 easier for the analysts 220, 221. Each of the dumps 215, 216 contain only specific pieces or subsets of information that have been extracted from dump 213.

Mediated access component 214 can balance the needs of analysts 220, 221 with the data protection desires of customer 211 to the benefit of all. The mediated access component 214 can be implemented in software, which can be a stand-alone program/service or one that is integrated with other programmatic code, which may provide other functions. In one embodiment, component 214 can be a component in a dump analysis tool which can provide a layered hierarchy of software dump 213 data. In one embodiment, mediated access component 214 can group content of the software dump 213 in various layers of encapsulation. Placing different content types in different layers can make managing, configuring functions of component 214 easier.

Sample 250 shows a set of different encapsulation layers, which the mediated access component 214 can utilize in one contemplated embodiment. The layers shown in scenario 250 are shown for illustrative purposely only and are not intended to constrain a scope of the invention. As shown, the encapsulation layers for a software dump can include non-privileged data 260 layer, privileged data layer 262, and trusted data layer 264. Each layer 260-264 can be further divided into additional subcategories, like compartment 266 and compartment 267. In one implementation, different set of rules used by the mediated access component 214 can be used to handle the different encapsulation layers. For example, less restrictive rules can be applied when determining whether a data element classified as non-privileged data 260 should be included within a dump 215, 216 compared to more restrictive rules applicable to determining whether a data element classified as privileged data 262 should be included. Additionally, different security groups and/or people can be established for different analysts 220, 221, where each group is associated with one or more encapsulation layer 250. Inclusion or exclusion in a defined group can be one factor used by component 214 in determining whether content from dump 213 should be included in a tailored dump 215, 216 file.

In one embodiment, a customer 211 can define a set of rules for each of the layers 252. In another embodiment, a feedback loop can be established, where customer 211 approves/modifies tailored dumps 215, 216 before they are conveyed. The mediated access component 214 can use this customer 211 provided feedback to train internal rules/weights to improve performance over time.

Scenario 230 illustrates a process flow of problem determination between a customer 231 and analyst 232. In scenario 230, customer 231 can provide tailored dump 233 for analyst 232 to perform an analysis 241 against. Initially, received dump 233 can include only non-privileged data extracted from dump 240. Non-privileged data can include information about a computing device such as hardware configuration, state information, process and thread information, memory information, and the like. In situations where analyst 232 requires additional access to data of dump 240, analyst 232 can submit an access 234 request for the needed data. This request can be very specific to what data elements is needed or can be more generic requesting an increased "level" of data, such as requesting information categorized as trusted data. Customer 231 can review the request 234 and can situationally grant/deny it. When a request is approved, additional information can be derived from dump 240 and conveyed to analysts 232 as privileged data 243, which can be analyzed 244.

It should be emphasized that a set of definitions/rules used by the mediated access component 214 need not be determined in advance. That is, analyst 232 can create a new dump analysis module, which filters or formats information in ways that no one had specifically anticipated ahead of time. For example, when the analyst 232 initially considers a set of results 233, new concerns/considerations may arise. These can be defined in an access request, within a component 214 module. The customer 231 can examine the proposed module (or it's input/output) and can determine whether that module should be executed. If so, the module itself is approved 235. The new module can produce a new data set 243, which analysts 232 can examine 244.

Scenarios 210-250 are for illustrative purposes only and should not be construed to limit the invention in any regard. For example, although scenario 230 shows that additional content is provided to analysts 232 upon request 234, in one contemplated embodiment, this requested content can be included in the originally issued dump 233, yet be protected so that it was initially inaccessible to analysts 232. Use of content protection and intra-file security techniques can be useful, when multiple different analysts 220, 221 may access a common file, yet when different content is to be displayed depending upon which analysts 220, 221 is accessing the file.

It should be appreciated that the mediated access component 214 is able to be utilized in many contexts, such as problem troubleshooting and in forensic analysis situations. That is, the information being protected by the mediated access component 214 is the same type of information that is analyzed during a forensic analysis to find information contained upon a data store of a computing device. Use of the component 214 can help establish a balance between information needed/appropriate for an analyst 220, 221 and information that should not be available, which protects the customer's 211 privacy.

In a troubleshooting context, for example, an analyst 220 should be provided sufficient information to solve a customer's 211 technical problem, while not being granted privileged information, such as a customer's 211 credit card number used during electronic commerce transactions.

In a forensic analysis context, an analyst 220 can be granted limited access to "forensic data" (e.g., core dump 213 data) on the device 212 by an employer of customer 211, by the courts (i.e., through a warrant of limited scope), or by some other authorizing agency. Should the obtained data 215, 216 include problem indicators, important information, which was protected by protector 214, is still maintained within a received data file 215, 216 and can be extracted should further permission to do so be granted.

It is even contemplated, that an analyst 220, 221 can remotely trigger an action to generate a dump 213 to be provided with protected data 215, 216 in real time. Thus, real time forensic data can be made available, without comprising privacy concerns of a customer 211. In a problem solving situation, real time access to protected data 215, 216 can be used to circumvent an escalating device experienced problem before a "crash" occurs.

Figure 3:
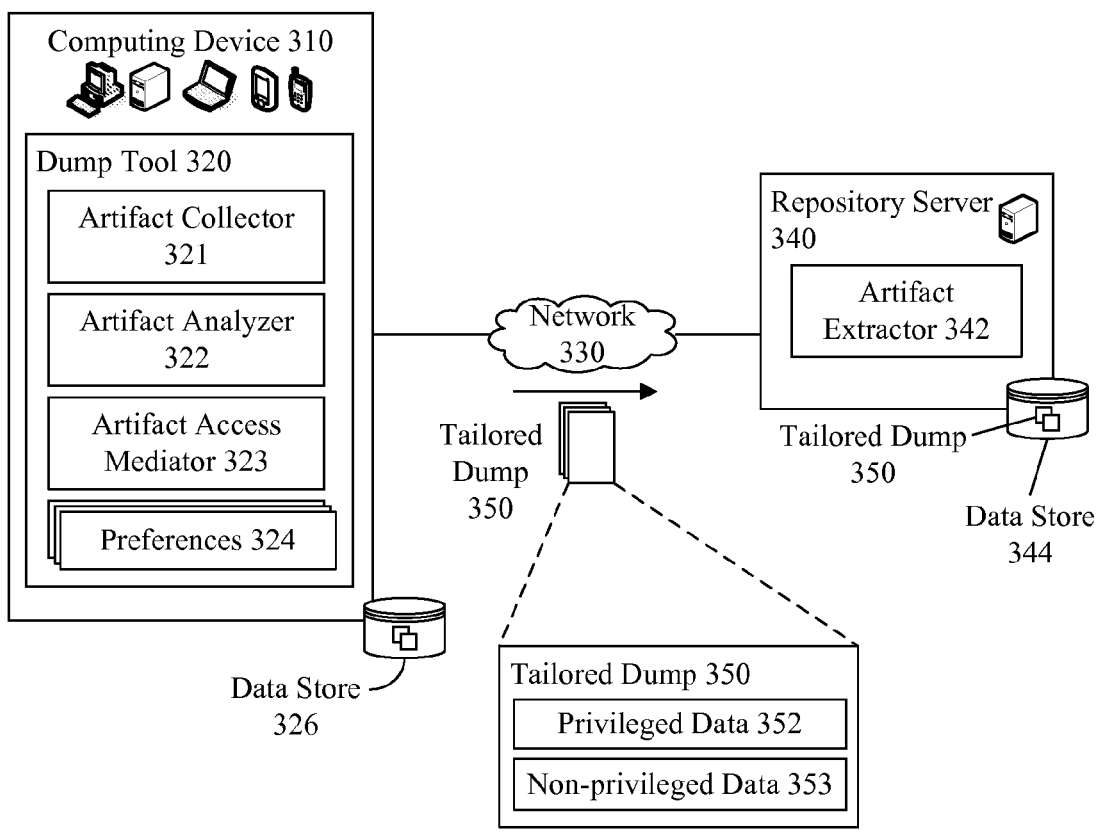
FIG. 3 is a schematic diagram illustrating a system for providing mediated access to software dump information in accordance with an embodiment of the inventive arrangements disclosed herein.

FIG. 3 is a schematic diagram illustrating a system 300 for providing mediated access to software dump information in accordance with an embodiment of the inventive arrangements disclosed herein. In system 300, a dump tool 320 can create and protect a software dump in data store 326. Dump tool 320 can be utilized to provide remotely located users, such as analysts performing problem determination actions, with tailored dump 350 output. For example, tailored dump 350 output can be conveyed to repository server 340, where it is stored in data store 344.

The dump tool 320 can include software, hardware, and/or firmware that instruct and permit the computing device 310 to perform the functions described herein. In one embodiment, the dump tool 320 can be an integral set of components of the computing (or electronic) device 310. These components can include peripherals and network elements communicatively linked to device 310, which contribute to the performance of at least a portion of the functions described herein. In one embodiment, the dump tool 320 can include a computer program product digitally encoded in a computing device usable medium which directs general purpose hardware components of device 310 to perform the functions described herein. That is, a computer program stored on a removable medium, such as a compact disk (CD) or a digital video disk (DVD), is to be considered within a scope of the definition of the dump tool 320, as is an installed program, as is a distributed program, as is a Web service.

The dump tool 320 can include an artifact collector 321, artifact analyzer 322, artifact access mediator 323, and preferences 324. Artifact collector 321 can be responsible for extracting and aggregating information about computing device 310. Artifacts can be software application specific and/or hardware specific. Artifacts can include, but are not limited to, software objects specifying a state of data structures in an application program, call stack objects, debugging symbols, program data, source code, libraries loaded into memory, and the like. Any software object able to hold or indicate state information of an associated computing device 310 is able to be an artifact for purposes of tool 320. The artifact collector 321 can have an ability to configure/create customized artifacts at various levels of granularity. For example, a customized module defined for a new access mediation task can utilize a set of new software artifacts, which can be defined within the module so that artifact collector 321 can correctly handle the new software artifacts.

Artifact analyzer 322 can extract values for artifacts from a raw software dump stored in data store 326. The artifact analyzer 322 can support various types of dumps, such as core dumps, system dumps, virtual machine dumps, memory dumps, application state dumps, and the like. Different types of dumps can have different formatting characteristics, which require different mappings to the artifacts.

The artifact access mediator 323 can determine which artifact values are to be permitted to a recipient. That is, the artifact access mediator 323 can determine a sensitively level of data derived from a dump and/or whether this data is applicable to a particular request. Access can be based at least in part upon a set of configurable preferences 324 and values. The artifact access mediator 323 can also permit pluggable modules or files, each of which defines content to be placed in an associated tailored dump 350 based upon a raw software dump.

Rules for determining data categorization can be configured by preferences 324 and/or modified by access modules. Configuration of tool 320 preferences can be controlled by a user utilizing a graphical user interface (GUI), which can present users with collected artifacts enabling the user to manually sort and protect privileged data.

While in one embodiment, the dump tool 320 ensures that no unauthorized/privileged data 352 is included in the protected dump 350, in an alternative embodiment at least a portion of data conveyed in dump 350 can be encrypted as a protection mechanism. Use of encryption can be particularly useful in situations where multiple users have access to the repository server 340 and where different ones of these users have different privileges. When encryption is used, tailored dumps 350 can be encoded/encrypted/secured when conveyed over network 330. An artifact extractor 342 can be used to decode/decrypt/unsecure the tailored dump 350. In another embodiment, a tailored dump 350, which includes privileged data 352 and non-privileged data 353 can be selectively protected. Artifact extractor 342 can handle authentications and determinations regarding which portions of the dump 350 can be accessed by which user. For example, an authorized analyst may be able to see all the data 352-353 contained in dump 350, while an unauthorized analyst will only see the non-privileged data 353.

The diagrams in FIGS. 2 and 3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for mediating access to content of a software dump comprising:
    identifying an event occurring within a computing device, which causes data to be dumped to file;
    creating a dump file responsive to the event, wherein said dump file comprises data defining a state of the computing device;
    analyzing using an analysis module operating on the dump file to determine content to be placed in a first tailored dump file and a second tailored dump file, wherein said first tailored dump file comprises a first subset of the content of the dump file for which first access privileges have been granted in accordance with the analysis module, and said second tailored dump file comprises a second subset of the content of the dump file for which second access privileges have been granted in accordance with the analysis module, wherein the analysis module defines different permission category for different analysts;
    creating a first output file based on said first tailored dump file and a second output file based on said second tailored dump file, wherein the first and second output files are both created responsive to the event;
    identifying a first analyst who is to receive the first output file and a second analyst who is to receive the second output file;
    during when analyzing the dump file, determining a permission category from the different permission categories associated with the first and second analysts; and
    limiting the content in each of the first and second output files to content authorized based upon the determined permission category, respectively.

2. The method of claim 1, further comprising:
    conveying at least one of the first and second output files over a network to a requestor responsive to a request, which triggered the event occurrence.

3. The method of claim 2, wherein said at least one of the first and second output files is generated in real-time responsive to a real-time request.

4. The method of claim 1, wherein said first and second output files are written in a different format than the dump file, wherein said different format is a human-readable format.

5. The method of claim 1, further comprising:
    receiving an information request from a remotely located device; and
    determining a related analysis module applicable to the information request from a plurality of previously defined analysis modules, wherein said analysis module used to analyze the dump file is the determined related analysis module.

6. The method of claim 1, further comprising:
    presenting the first and second output files to an authorized user of the computing device; and
    conveying at least one of the first and second output files to a remotely located computing device only upon approval by the authorized user.

7. The method of claim 1, wherein said event is an error condition, which causes the computing device to shut down or to execute a compensation action that changes a processing state of the machine, wherein the dump file contains information useful for an analyst to determine a cause of the error condition.

8. The method of claim 1, wherein the dump file is at least one of a core dump, a system dump, a service dump, and a JAVA dump, which comprises protected data to which an analyst is not authorized to access, said method further comprising:
    conveying at least one of the first and second output files to the analyst, wherein said output file lacks the protected content.

9. The method of claim 1, wherein the dump file is a dump of application specific information, wherein the creation of the dump file occurs while an associated application is executing, and wherein the dump file contains application state information, said method further comprising:
    conveying the dump file to an analyst associated with the application.

10. The method of claim 1, further comprising:
    the computing device receiving a new analysis module from a remote source;
    examining the new analysis module to determine whether the new analysis module is to be accepted or rejected;
    accepting the new analysis module responsive to the examining;
identifying a new event occurring within a computing device, which causes data to be dumped to file and that causes the new analysis module to be utilized;
    creating a new dump file responsive to the new event, wherein said new dump file comprises data defining a state of the computing device;
    analyzing using the new analysis module operating on the dump file to determine content to be placed in a new tailored dump file, wherein said new tailored dump file comprises a subset of the content of the new dump file for which access privileges have been granted in accordance with the new analysis module; and
    creating a new output file which comprises said determined content of the new dump file.

11. The method of claim 1, further comprising:
    the computing device receiving a new analysis code from a remote source, wherein said new analysis code is set of code configured to modify code of the analysis module;
    examining the new analysis code to determine whether the new analysis code is to be accepted or rejected;
    accepting the new analysis code responsive to the examining;
    modifying the analysis module in accordance with the new analysis code;
identifying a new event occurring within a computing device, which causes data to be dumped to file and that causes the modified analysis module to be utilized;
    creating a new dump file responsive to the new event, wherein said new dump file comprises data defining a state of the computing device;
    analyzing using the modified analysis module operating on the dump file to determine content to be placed in a new tailored dump file, wherein said new tailored dump file comprises a subset of the content of the new dump file for which access privileges have been granted in accordance with the modified analysis module; and creating a new output file which comprises said determined content of the new dump file.

12. A system for mediating access to dump file content comprising:
a computing device including a processor;
an artifact analyzer executed by the processor responsive to an event and configured to extract content from a software dump file, wherein said dump file comprises data defining a state of the computing device; and
an artifact access mediator executed by the processor responsive to the artifact analyzer operating on the dump file responsive to the event and configured to generate a first tailored dump output comprising a first subset of information from the software dump file based upon first permissions determined by an access module, and a second tailored dump output comprising a second subset of information from the software dump file based upon second permissions determined by the access module, wherein the artifact access mediator ensures that the first and second tailored dump files lack protected content other than content specifically authorized by the access module corresponding to the first and second permissions, respectively, wherein the analysis module defines different permission category for different analysts, wherein the first tailored dump is for a first analysts and wherein the second tailored dump is for a second analysts, wherein the artifact access mediator is further configured to:
determine a permission category from the different permission categories associated with the first and second analysts; and
limit the content in each of the first and second output tailored dumps to content authorized based upon the determined permission category, respectively.

13. The system of claim 12, further comprising:
a software dump generator executed by the processor and configured to automatically generate the software dump file responsive to receiving requests from remotely located computing devices; and
a tailored dump output delivery component executed by the processor and configured to convey at least one of the first and second tailored dump files to request issuing remotely located computing devices.

14. The system of claim 13, wherein at least one of the first and second tailored dump files is created and conveyed in real-time responsive to receiving a request.

15. The system of claim 12, further comprising:
a data store comprising plurality of configurable preferences, wherein said preferences comprise a set of settings defining what content is to be considered protected by the artifact access mediator, wherein said configurable preferences are configurable by an authorized user of the computing device.

16. A computer program product for mediating access to dump file content, the computer program product comprising:
a non-transitory computer readable medium having computer usable program code embodied therewith, the computer usable program code comprising:
computer usable program code configured to identify an event occurring within a computing device, which causes data to be dumped to file;
computer usable program code configured to create a dump file responsive to the event, wherein said dump file comprises data defining a state of the computing device;
computer usable program code configured to analyze using analysis module the dump file to determine content to be placed in a first tailored dump file and a second tailored dump file, wherein said first tailored dump file comprises a first subset of the content of the dump file for which first access privileges have been granted in accordance with the analysis module, and said second tailored dump file comprises a second subset of the content of the dump file which second access privileges have been granted in accordance with the analysis module, wherein the analysis module defines different permission category for different analysts;
computer usable program code configured to create a first output file based on said first tailored dump file and a second output file based on said second tailored dump file, wherein both first and second output files are created responsive to the event;
computer usable program code configured to identify a first analyst who is to receive the fist output file and a second analyst who is to receive the second output file;
computer usable program code configured to, during when analyzing the dump file, determine a permission category from the different permission categories associated with the first and second analysts; and
computer usable program code configured to limit the content in each of the first and second output files to content authorized based upon the determined permission category, respectively.

17. The computer program product of claim 16, the computer usable program code further comprising:
computer usable program code configured to convey at least one of the first and second output files over a network to a requestor responsive to a request, which triggered the event occurrence.

18. The computer program product of claim 16, the computer usable program code further comprising:
computer usable program code configured to receive an information request from a remotely located device; and
computer usable program code configured to determine a related analysis module applicable to the information request from a plurality of previously defined analysis modules, wherein said analysis module used to analyze the dump file is the determined related analysis module.

19. The computer program product of claim 16, further comprising:
computer usable program code of the computing device configured to receive a new analysis module from a remote source;
computer usable program code configured to examine the new analysis module to determine whether the new analysis module is to be accepted or rejected;
computer usable program code configured to accept the new analysis module responsive to the examining;
computer usable program code configured to identify a new event occurring within a computing device, which causes data to be dumped to file and that causes the new analysis module to be utilized;
computer usable program code configured to create a new dump file responsive to the new event, wherein said new dump file comprises data defining a state of the computing device;
computer usable program code configured to analyze using the new analysis module operating on the dump file to determine content to be placed in a new tailored dump file, wherein said new tailored dump file comprises a subset of the content of the new dump file for which access privileges have been granted in accordance with the new analysis module; and
computer usable program code configured to create a new output file which comprises said determined content of the new dump file.

* * * * *